Figure 1:
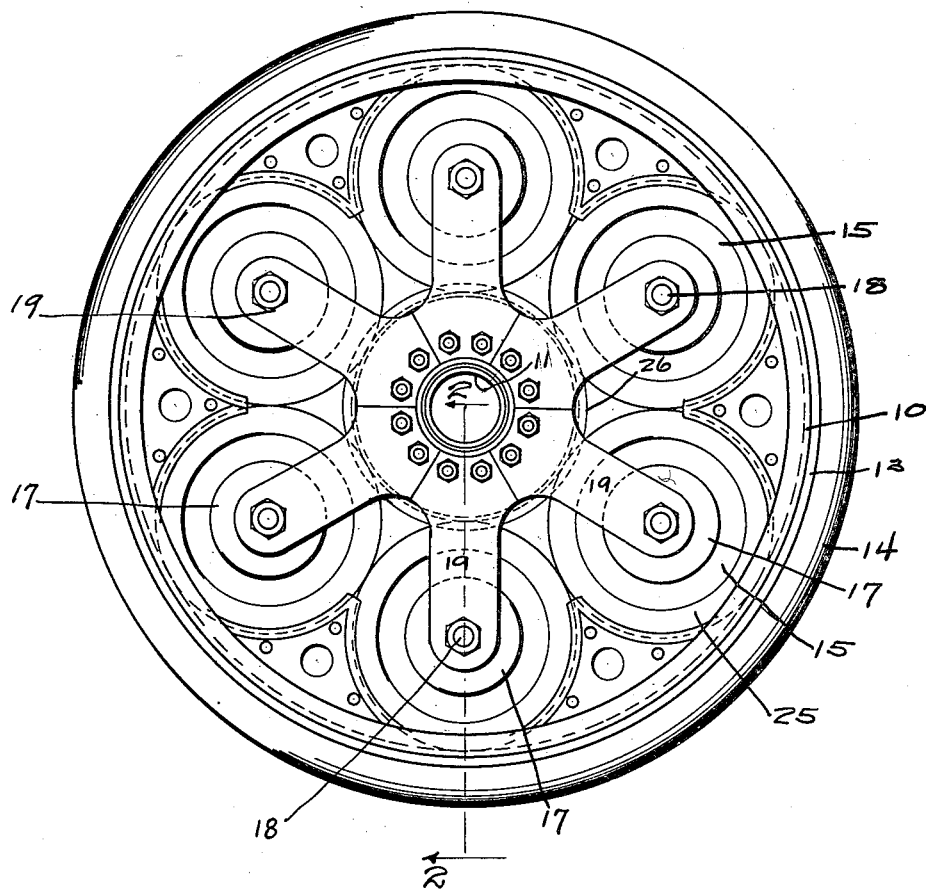

H. B. COATS.
CUSHION WHEEL.
APPLICATION FILED AUG. 2, 1916.

1,285,944.

Patented Nov. 26, 1918.
2 SHEETS—SHEET 1.

INVENTOR
HENRY B. COATS
BY
Lockwood & Lockwood
ATTORNEYS

H. B. COATS.
CUSHION WHEEL.
APPLICATION FILED AUG. 2, 1916.
1,285,944.
Patented Nov. 26, 1918.
2 SHEETS—SHEET 2.
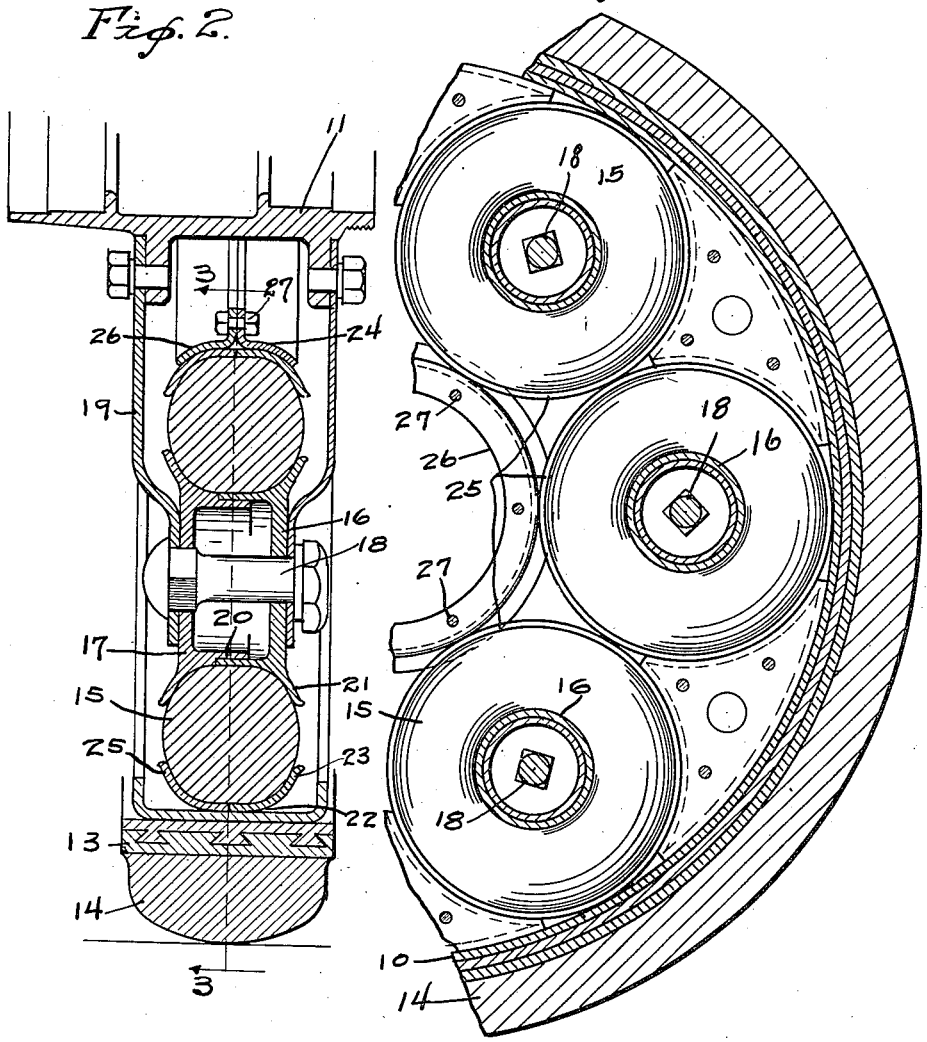
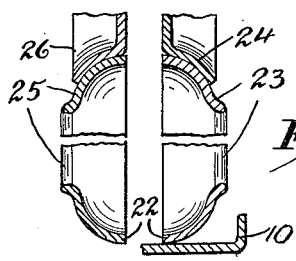
INVENTOR
HENRY B. COATS
BY
Lockwood & Lockwood
ATTORNEYS

UNITED STATES PATENT OFFICE.

HENRY B. COATS, OF VEEDERSBURG, INDIANA.

CUSHION-WHEEL.

1,285,944.  Specification of Letters Patent.  Patented Nov. 26, 1918.

Application filed August 2, 1916. Serial No. 112,822.

*To all whom it may concern:*

Be it known that I, HENRY B. COATS, a citizen of the United States, and a resident of Veedersburg, county of Fountain, and State of Indiana, have invented a certain new and useful Cushion-Wheel; and I do hereby declare that the following is a full, clear, and exact description thereof, reference being had to the accompanying drawings, in which like letters refer to like parts.

The object of this invention is a type of vehicle wheel having a better construction and operation than the ordinary hard rubber tire wheels commonly used on motor trucks and the like, wherein the hub floats in the wheel, being yieldingly supported therein by rubber cushions. The cushions in which the hub floats impart a resiliency thereto which is not found in the ordinary type of wheel.

The chief feature of the invention consists in providing a tubular arm containing a rubber cushion or cushions within it, said cushion or cushions supporting an annular member located in said tubular arm and connected rigidly with the hub so that said annular member will be yieldingly supported by said cushion or cushions and thus yieldingly support the hub in the rim of the wheel.

Another feature of the invention consists in mounting the cushions without any clenchers or clencher rims and without any recesses in the cushion whereby the same is weakened or readily becomes weakened on account of the spreading of the sides of the cushion during use. As the invention is here shown, the sides of the cushion have ample room for spreading without interference by any flange or bead or other rigid surface. The rim flanges turn outwardly instead of inwardly, and the outer and inner rim flanges are so far apart they do not interfere with the lateral spreading of the cushion under weight.

Still a further feature of the invention consists in the construction of said arms whereby the cushions may be easily removed or replaced between the outer and inner rims. In order to accomplish this, it is necessary that the rims be so constructed that they can be removed and assembled.

The full nature of the invention will be understood from the accompanying drawings and the following description and claims:

In the drawings, Figure 1 is a side elevation of the assembled wheel. Fig. 2 is a section on the line 2—2 of Fig. 1. Fig. 3 is a section on the line 3—3 of Fig. 2, showing the cushions in elevation. Fig. 4 is a fragmentary sectional view of the cushion supporting means.

There is shown herein an annular wheel rim 10 and a centrally located hub 11, said hub and the parts secured thereto being adapted to float within the wheel rim so that said rim and hub may yield radially with reference to the other under the influence of the load. The rim 10 has its periphery transversely flat and a hard rubber band 13 is secured thereto, a soft rubber tire 14 being secured to and surrounding the hard rubber band.

Between the hub and rim there is a series of annular rubber cushions 15 mounted on and surrounding the cylindrical member formed of the parts 16 and 17 which are held together by a bolt 18 between the radial arms 19 which extend from and are secured to the hub. Said parts 16 and 17 have telescoping and interlocking flanges 20. Said inner member has peripheral and outwardly turning flanges 21 which, together with the periphery of said member, constitutes a supporting member or holding means for the cushion. The cushions 15 are surrounded by annular supporting members 23 and 25 which are secured to the rim 10 at one point and rest against and are held together by an annular ring surrounding the hub member 11, said annular ring being formed of plates 24 and 26, the meeting edges of which are provided with flanges through which extend bolts 27 and by means of which the plates are secured together, and the outer edges of said plates are so curved that when bolted together they form a channel for the reception of the members 23 and 25 and the cushions 15 carried thereby, and as the ring structure formed by the members 24 and 26 floats around the hub 11 and does not come in contact therewith, all of the cushions 15 are brought into action when the wheel is in operation. The lateral edges of the outer supporting members 22 are turned outwardly and laterally like the flanges 21 of the inner supporting member. The lateral edges of the outer member and the flanges 21 are quite a distance apart so that there is ample room for the lateral extension of the cushion under load without interference by said members or flanges. The body of the bolt 18 is rectangular, as shown in Fig. 2, so that it cannot turn in the members through which it extends and will hold the members 16 and 17 on which the cushion is mounted from having any turning movement.

Before the cushions are assembled in the wheel, all of the parts therein are assembled excepting the members 17 and 25 and the annular plate 26. The cushions are then set in place and the plates 26 and members 17 secured in place by the bolts 27 and 18 respectively. The radial arms 19 are then bolted to the hub and inner members formed by the parts 16 and 17. The cushion is then securely locked in place so that any side play will be prevented.

The invention claimed is:

1. A vehicle wheel having an outer rim, a hub, a series of intermediate annular cushions for supporting the rim and hub in relation to each other, an outer cushion support for each cushion formed of two members, one member being rigidly secured to said wheel and the other member removably secured thereto, a removable inner cushion support for holding each cushion in place, means rigidly connecting the inner cushion supports and the hub, a ring-like structure formed of two plate sections having flared edges forming a channel to hold said cushion supporting members together, and bolts for securing said plate sections together.

2. A vehicle wheel having an outer rim, a hub, a series of intermediate annular cushions for supporting the rim and hub in relation to each other, an outer cushion receiving member for each cushion comprising two independent members, one of which is rigidly secured to said wheel and the other removably secured thereto, an inner cushion receiving member having two telescoping and removable members adapted to be secured together from each side of said cushion, arms extending from said hub to each side of said inner cushion receiving member, a bolt extending through said arms and inner member for securing them rigidly together, a collar structure formed of two plate sections arranged to hold said cushion receiving members together, and means to secure said plate sections together.

In witnesses whereof I have hereunto affixed my signature.

HENRY B. COATS.